United States Patent [19]
Tilley et al.

[11] Patent Number: 5,349,532
[45] Date of Patent: Sep. 20, 1994

[54] SPACECRAFT ATTITUDE CONTROL AND MOMENTUM UNLOADING USING GIMBALLED AND THROTTLED THRUSTERS

[75] Inventors: Scott W. Tilley, Belmont; Tung Y. Liu, Union City; John S. Higham, Mountain View, all of Calif.

[73] Assignee: Space Systems/Loral, Palo Alto, Calif.

[21] Appl. No.: 875,276

[22] Filed: Apr. 28, 1992

[51] Int. Cl.[5] .................... B64G 1/26; B64G 1/24; F03H 1/00
[52] U.S. Cl. .................... 364/459; 364/434; 244/3.21; 244/164; 244/171; 60/201
[58] Field of Search ............... 364/459, 434; 244/321, 244/322, 164, 165, 171-173, 166, 169; 60/202, 201

[56] References Cited

U.S. PATENT DOCUMENTS

| | | | |
|---|---|---|---|
| 3,429,526 | 2/1969 | Genty | 244/1 |
| 3,866,025 | 2/1975 | Cavanagh | 235/150.2 |
| 3,937,423 | 2/1976 | Johansen | 244/3.22 |
| 4,071,211 | 1/1978 | Muhlfelder et al. | 244/165 |
| 4,294,420 | 10/1981 | Broquet | 244/165 |
| 4,521,855 | 6/1985 | Lehner et al. | 364/434 |
| 4,617,634 | 10/1986 | Izumida et al. | 364/455 |
| 4,767,084 | 8/1988 | Chan et al. | 244/164 |
| 4,786,019 | 11/1988 | Uken | 244/169 |
| 4,825,646 | 5/1989 | Challoner et al. | 60/202 |
| 4,837,699 | 6/1989 | Smay et al. | 364/434 |
| 4,848,706 | 7/1989 | Garg et al. | 244/169 |
| 4,931,942 | 6/1990 | Garg et al. | 364/459 |
| 4,955,559 | 9/1990 | Kaminskas | 244/52 |
| 4,991,393 | 2/1991 | Otten et al. | 60/204 |
| 5,054,719 | 10/1991 | Maute | 244/164 |
| 5,098,041 | 3/1992 | Uetrecht | 244/164 |
| 5,205,518 | 4/1993 | Stetson, Jr. | 244/165 |

FOREIGN PATENT DOCUMENTS

0499815A1  1/1992  European Pat. Off. .

OTHER PUBLICATIONS

T. G. Duhamel, "Implementation of Electric Propulsion for North–South Station Keeping on the Eurostar Spacecraft," 1989, American Institute of Aeronautics and Astronautics, Inc., pp. 1 through 9.

ETS–VI satellite program handout, distributed during a conference with attendance limited to employees of Toshiba, Space Systems/Loral, Inc., and Intelsat, 1989, ten pages.

Primary Examiner—Thomas G. Black
Assistant Examiner—Julie D. Day
Attorney, Agent, or Firm—Perman & Green

[57] ABSTRACT

A spacecraft (201) maintains its north-south positioning by using one of two pairs of single-gimballed throttled thrusters (221-224) on a face of the spacecraft (201). The throttles (118) and gimbals (116) of the thrusters (221-224) are controlled to produce torques on the spacecraft (201) that will maintain a desired attitude for the spacecraft (201) while simultaneously desaturating the momentum stabilizing wheels (120, 121) of the spacecraft (201).

13 Claims, 8 Drawing Sheets

GIMBAL/THROTTLE ION PROPULSION SUBSYSTEM ASSEMBLY

FIG. 2d

$$\frac{\psi}{\psi_{ref}} = \frac{1}{1 + \frac{1}{0.4939 K_\phi} S}$$

FIG. 3

$$\frac{h_y}{h_{y,ref}} = \frac{1}{1 + \frac{1}{K_\Theta} S}$$

FIG. 4

$$\frac{h_z}{h_{z,ref}} = \frac{1}{1 + \frac{1}{K_\psi} S}$$

SPACECRAFT ATTITUDE CONTROL AND MOMENTUM UNLOADING USING GIMBALLED AND THROTTLED THRUSTERS

FIELD OF THE INVENTION

The present invention relates generally to spacecraft positional control and specifically to a system and method of simultaneously gimballing and throttling spacecraft thrusters to maintain a desired spacecraft attitude and unload accumulated pitch and yaw momentum while performing north-south station-keeping maneuvers.

DESCRIPTION OF BACKGROUND ART

Once a geosynchronous spacecraft is on-station, north-south station-keeping maneuvers consume the majority of the total propellant of the spacecraft. For geosynchronous communications spacecraft, controlling spacecraft attitude to orient communications hardware to a preselected planetary location is essential, as is periodic unloading or "desaturation" of momentum stored in the momentum wheel stabilization system of the space, craft. Therefore, increasing efficiency of north-south station-keeping, attitude correction, and momentum desaturation may significantly lengthen mission lifetime Orbiting spacecraft may use several mechanisms for station-keeping, attitude control, and momentum desaturation The bi-propellant chemical thrusters typically used to take a spacecraft from a transfer orbit to a synchronous orbit could also be used for station-keeping, but such thrusters produce relatively powerful disturbance torques due to thruster misalignment, center of mass offsets, and plume impingements. They are, therefore, ill-suited for highly accurate attitude pointing during station-keeping, and are of almost no use in fine attitude adjustments and fine momentum desaturation. Reliability concerns also dictate that such thrusters be reserved for major spacecraft orbit and attitude error control over the lifetime of the spacecraft.

A spacecraft could use magnetic torquers for attitude control and momentum desaturation, but these devices do not assist in station-keeping since they produce torque without lateral force. Magnetic torquers change the spacecraft's attitude by using the force of an electric coil's dipole moment with respect to the earth's magnetic field. Unfortunately, magnetic torquers are heavy, provide little power, and cannot be used to control the pitch attitude of the spacecraft due to the alignment of the dipole moment section with the magnetic field of the earth.

A third possible technique is ion propulsion. In an ion propulsion thruster, an electro-magnetic field ionizes a propellant such as xenon gas, and an electrostatic field accelerates the propellant away from the thruster body. Although there is an initial weight penalty for the ion propulsion system hardware, the specific impulse of ion trusters is significantly higher than that of chemical propellants, making ion propulsion feasible for station-keeping in long missions. In addition, ion thrusters can be used to control spacecraft attitude and momentum in all three axes. For these reasons, ion thrusters are suitable and desirable for north-south station-keeping on spacecraft with long mission lifetimes.

As with chemical thrusters, ion thruster firings may produce disturbance torques on the spacecraft, resulting in undesired attitude motion. Solar pressure imparts an additional undesired disturbance on the spacecraft. Momentum wheel stabilization systems are commonly used to counteract such disturbance torques. Such systems typically include one or more momentum wheels and control loops to sense changes in the spacecraft attitude. Sensors on the spacecraft may detect yaw, pitch, and roll. The control loops determine the required speed of the wheels to absorb and off-load stored pitch and yaw momentum based on the sensed attitude. Commonly, yaw and pitch momentum are absorbed directly by the momentum wheels, while roll momentum is absorbed as a change in yaw body angle which results from the cross-coupling dynamics of momentum biased spacecraft. Momentum stored in the momentum wheels must be relieved periodically, or desaturated, to keep the momentum wheels within a finite operable speed range. Desaturation is typically accomplished by applying an external torque to the spacecraft through propulsion thrusting or magnetic torquing, to reduce the stored momentum.

Magnetic torquers cannot counteract stored momentum in one axis and are slow in the other two axes, as discussed above. Chemical thruster firings are ill-suited to maintenance of highly accurate spacecraft attitude during station-keeping because the disturbance torques they produce typically overwhelm the ability of wheel systems to maintain proper attitude. Chemical thruster firings are also typically too strong and difficult to control to use for wheel desaturation while simultaneously controlling highly accurate attitude pointing.

U.S. Pat. No. 3,937,423 to Johansen discloses a system for controlling the attitude of a vehicle along three axes with one momentum wheel of one degree of freedom, and pulsing several jets to enable correction of attitude error and dampen nutation of the vehicle while the spacecraft is on-orbit. The system of Johansen does not counteract disturbance torques or desaturate a momentum wheel system during station-keeping thrusting.

U.S. Pat. No. 4,521,855 to Lehner et al. discloses a scheme for measuring and correcting yaw error and yaw and roll momentum on a continuous on-orbit basis in an orbiting satellite, and attempts to use magnetic torquers to unload stored momentum. Lehner also references prior art helpful to the understanding of control loop and momentum distribution subsystems used in accordance with the present invention, but does not address simultaneous attitude control and momentum desaturation during north-south station-keeping maneuvers.

U.S. Pat. No. 4,767,084 to Chan et al. discloses apparatus for desaturating momentum wheels by firing thrusters from one face of the spacecraft, and then alternating firings between faces while simultaneously accomplishing automatic east-west station-keeping. Chan is helpful in referencing background art pertaining to spacecraft attitude control. Typically, east-west station-keeping requires far smaller forces than north-south station-keeping, and the disclosure of Chan et al. does not address a system for simultaneously desaturating momentum wheels while generating the relatively large lateral forces needed for north-south station-keeping. Furthermore, the disclosure of Chan et al. does not address the corresponding attitude maintenance or nutation problems.

U.S. Pat. No. 4,825,646 to Garg et al. discloses spacecraft attitude control apparatus requiring at least three pairs of thrusters. The system of Garg et al. does not relate to north-south station-keeping, nutation reduction, or momentum wheel desaturation.

U.S. Pat. No. 4,848,706 to Challoner et al. discloses an axial non-gimballed ion thruster mounted on the spun portion of a spacecraft and continuously fired for an integral number of spin periods to provide north-south velocity and attitude control. The disclosure of Challoner et al. does not address the problem of momentum wheel desaturation.

"Implementation of Electric Propulsion for North-South station keeping on the EUROSTAR Spacecraft", by T. G. Duhamel, presented at the AIAA/ASME/SAE/ASEE Twenty-fifth Joint Propulsion Conference, paper AIAA-89-2274, discloses an implementation of ion propulsion for north-south station-keeping on the EUROSTAR spacecraft. The ion thrusters are aligned through the center of mass of the spacecraft using a two-axis thruster pointing mechanism. The two-axis thrusters provide torques on both roll and yaw axes for minimizing disturbance torques caused by misalignment of thrust direction with respect to the center of mass. A pitch momentum wheel provides control around the pitch axis. The two-axis gimbals of the Duhamel disclosure do not appear to be used for three-axis attitude control, but simply to align the thrust direction with the center of mass. Duhamel does not disclose gimballing on one axis and adjusting the output of one thruster relative to another to produce torques in all three axes. Nor does the Duhamel paper disclose desaturation of the momentum wheels by producing torques. Duhamel teaches a relatively inefficient ion thruster cant of approximately forty-five degrees from the north-south direction. Furthermore, the two-axis gimbals called for by Duhamel are relatively more complex, heavy and unreliable than one-axis gimbals.

Yet another system, disclosed by Toshiba as part of an ETS-VI satellite program handout at a conference with attendance limited to employees of Toshiba, Space Systems/Loral, Inc., and Intelsat, uses four reaction wheels and chemical thruster momentum unloading for attitude stabilization during ion thrusting for east-west station-keeping. This disclosure does not teach the use of gimballed or throttled ion thrusters, nor does this disclosure teach simultaneous desaturation without chemical thrusters and attitude control during positioning maneuvers. Furthermore, the firing duration for east-west station keeping as pertains to this reference is significantly smaller than that required for north-south positioning.

Ideally, a spacecraft control system would maximize fuel efficiency during the mission lifetime without sacrificing reliability. A simple system for maintaining spacecraft attitude and desaturating momentum without independent thruster firings would realize this goal.

DISCLOSURE OF INVENTION

Efficiency and reliability can be enhanced over existing schemes by simultaneously stabilizing attitude dynamics and desaturating the momentum wheel system (122) of the spacecraft (201) while performing north-south station-keeping maneuvers. In order to achieve these results, the spacecraft (201) position, attitude, and stored wheel (120, 121) momentum are sensed; the forces necessary to perform station-keeping maneuvers, the torques required to produce the desired attitude for the spacecraft (201), and desaturate the wheels (120, 121) are determined; and ion propulsion thrusters (221-224) are throttled and gimballed to produce the desired torques on the spacecraft (201). Single-axis gimbals (116) are preferably used to reduce mass and increase reliability.

BRIEF DESCRIPTION OF THE DRAWINGS

FIG. 1b is a more detailed block diagram of the conventional chemical and magnetic controller (804) of FIG. 1a. FIG. 1c is a more detailed block diagram of the ion propulsion-based momentum desaturation and yaw controller 802 of FIG. 1a.

BEST MODE FOR CARRYING OUT THE INVENTION

Referring now to FIGS. 1a–d and 2, in accordance with the present invention, a three-axis stabilized momentum-biased spacecraft 201 is acted on by disturbance torques 306, 406, 506 in three dimensions and control torques 305, 405, 505, also in three dimensions. The resulting overall torques 307, 407, 507 integrate 308, 408, 508 into spacecraft dynamics, altering the pitch, yaw and roll of spacecraft 201. A spacecraft control system 806 consisting of an ion propulsion-based momentum desaturation and yaw controller 802 and a conventional chemical and magnetic controller 804 responds to spacecraft dynamics 308, 408, 508 to control spacecraft 201, as detailed below.

Figure 1A:
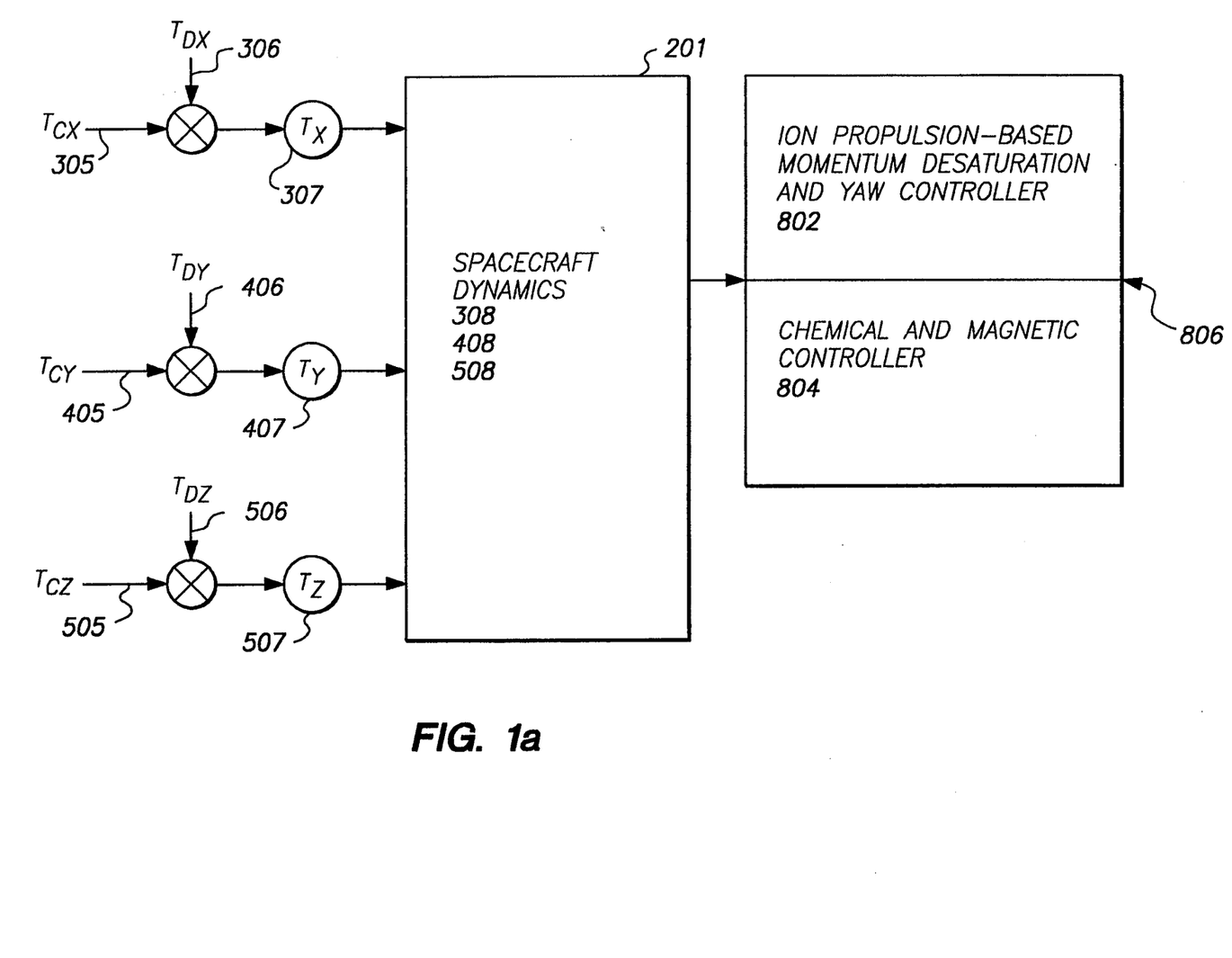
FIG. 1a is a block diagram of a control system (806) in accordance with the present invention.
Figure 1B:
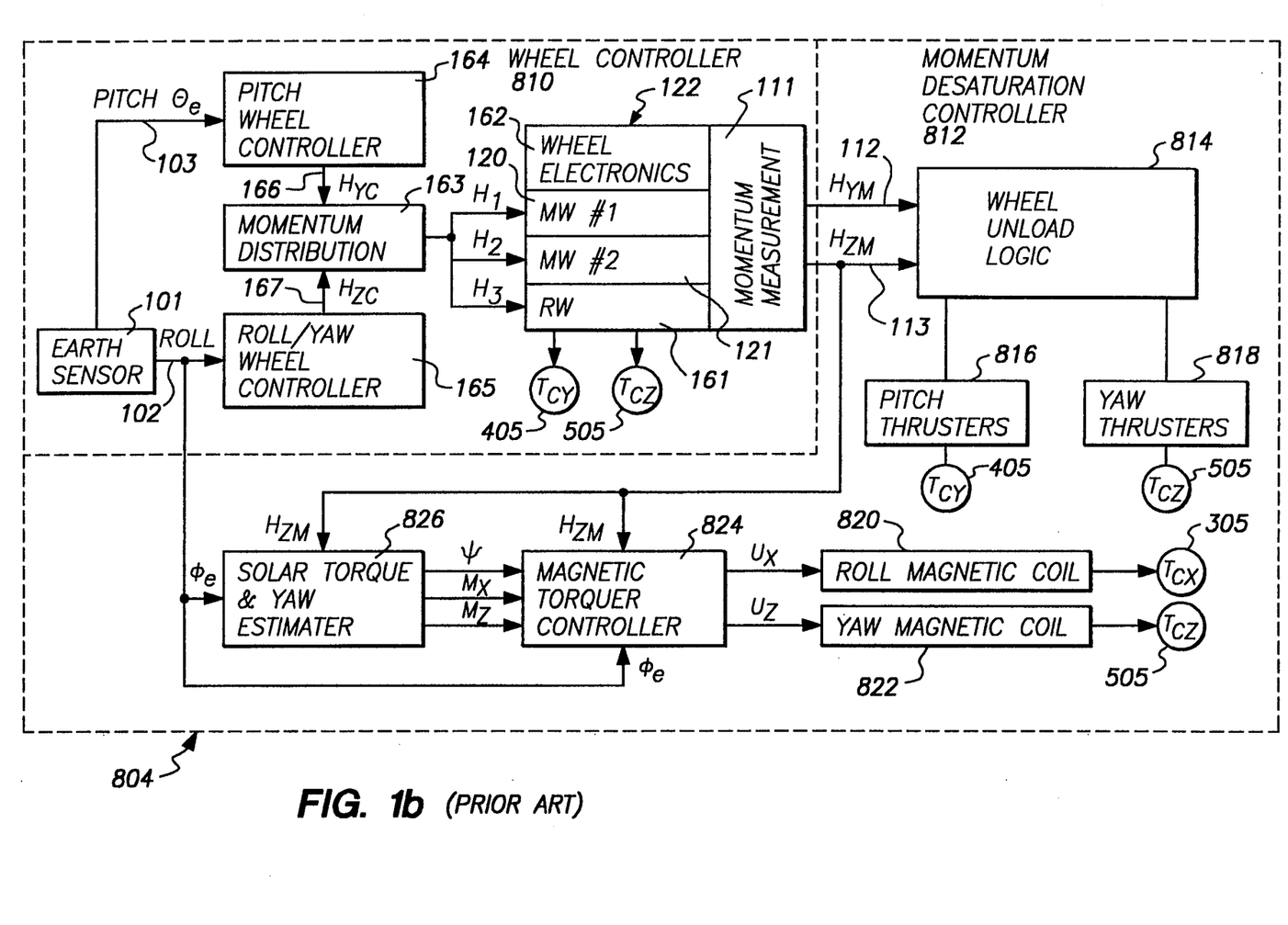

Referring primarily now to FIG. 1b, the conventional chemical and magnetic controller 804 of spacecraft 201 is shown. Controller 804 consists of two major components, a wheel controller 810 and a momentum desaturation controller 812. Wheel controller 810 uses an earth sensor 101 for the detection of pitch and roll angles 102, 103, respectively. These angles are converted by pitch and roll/yaw wheel controllers 164, 165 into momentum signals 166, 167, which are distributed by momentum distribution subsystem 163 to a momentum wheel subsystem 122. Momentum wheel subsystem 122 is conventional in design and consists of wheel electronics 162 for two primary pitch and yaw momentum wheels 120, 121, a reserve momentum wheel 161, and momentum measurement subsystem 111. FIG. 1d illustrates primary momentum wheels 120, 121. The momentum wheel system 122 measures the speeds of momentum wheels 120, 121 and momentum measurement subsystem 111 uses this information to produce signals $H_y$ 112 and $H_z$ 113, corresponding to stored spacecraft pitch and yaw momentum, respectively. In the preferred embodiment, pitch is decoupled from roll and yaw, but if the spacecraft 201 begins to roll, spacecraft yaw angle 107 will also change due to well-known gyroscopic cross-coupling effects between roll and yaw in pitch momentum-biased spacecraft. By storing or releasing momentum stored in wheels 120, 121, control torques 405, 505 are produced by wheel controller 810.

Referring still to FIG. 1b, spacecraft 201 is further controlled by momentum desaturation controller 812, based on spacecraft roll 102 and stored momentum 112, 113. In one aspect of the operation of momentum desaturation controller 812, roll angle 102 and momentum 113 signals are applied to solar torque and yaw estimator 826, which directs magnetic torquer controller 824 to energize roll and yaw magnetic coils 820, 822 for the production of torques 305, 505. In a second aspect of the operation of momentum desaturation controller 812, stored spacecraft momentum 112, 113 signals are applied to wheel unload logic 814, which directs pitch and yaw chemical thrusters 816, 818 to produce torques 405, 505 in order to keep stored spacecraft momentum within a desired range.

Figure 1C:
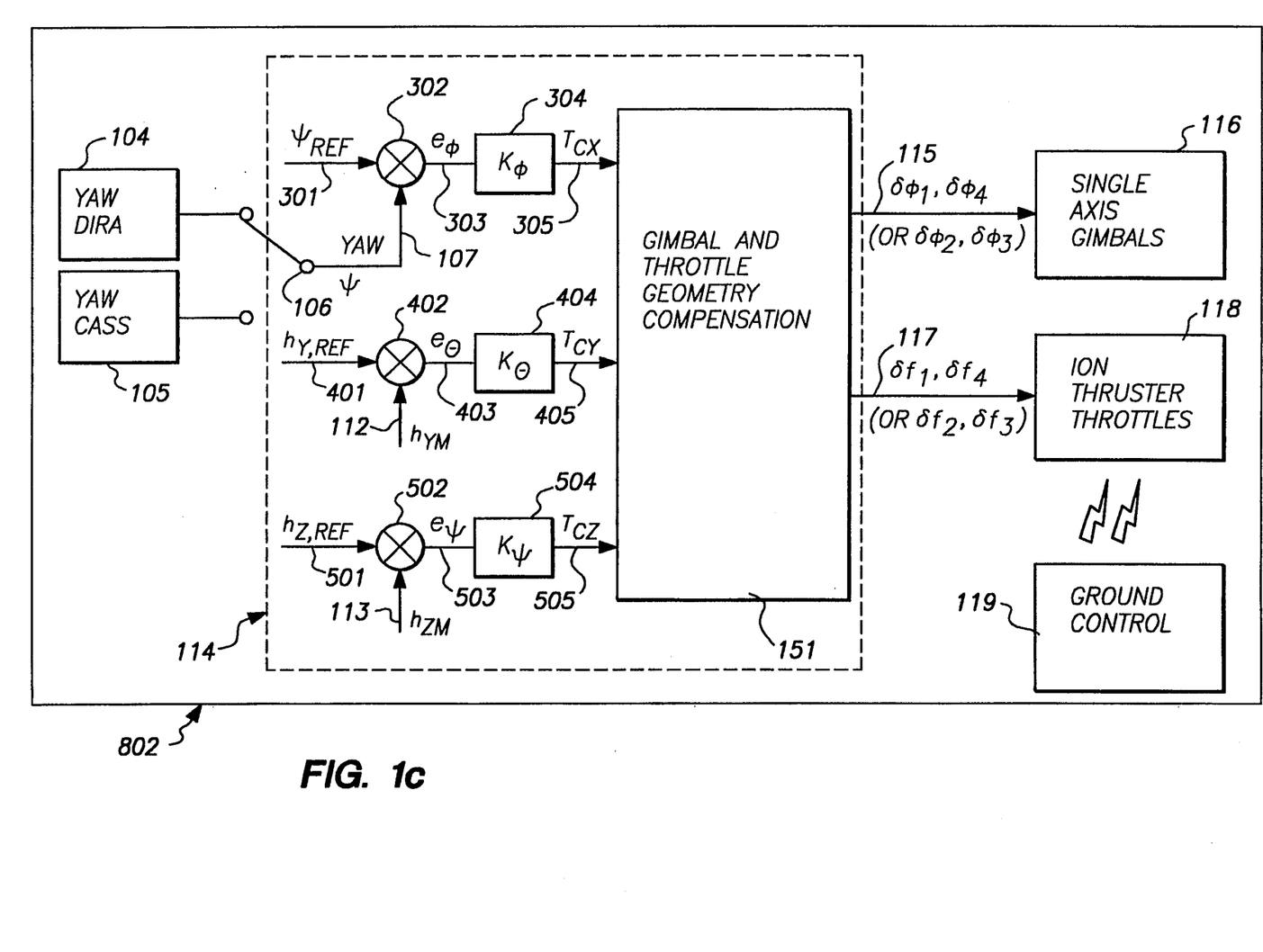
Figure 1D:
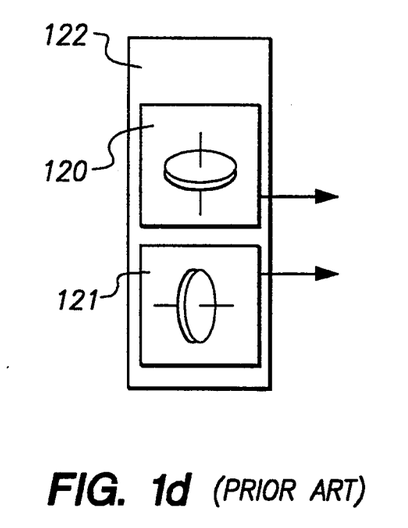
FIG. 1d is a representation of two momentum wheels ( 120, 121) of the conventional momentum wheel subsystem (122) of FIG. 1b.
Figure 2A:
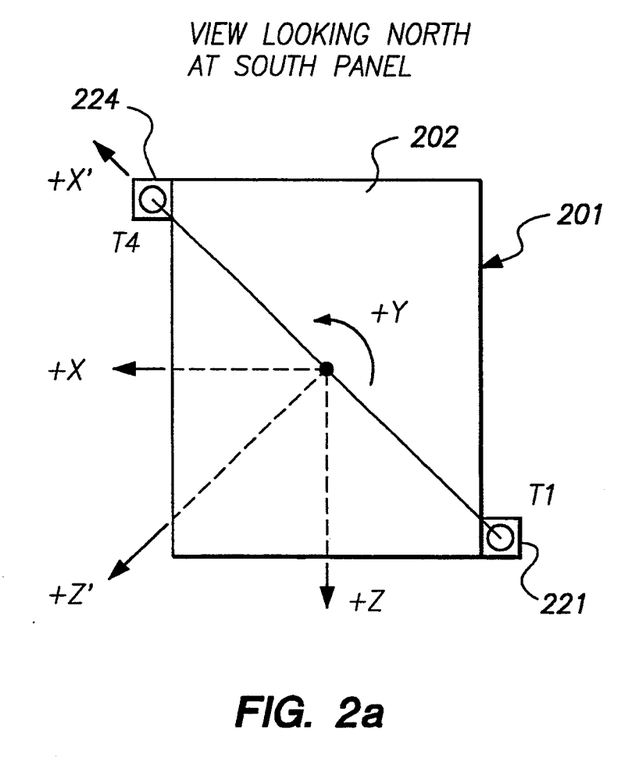
FIG. 2a is a view of the south panel (202) of a spacecraft (201) in accordance with the present invention.
Figure 2B:
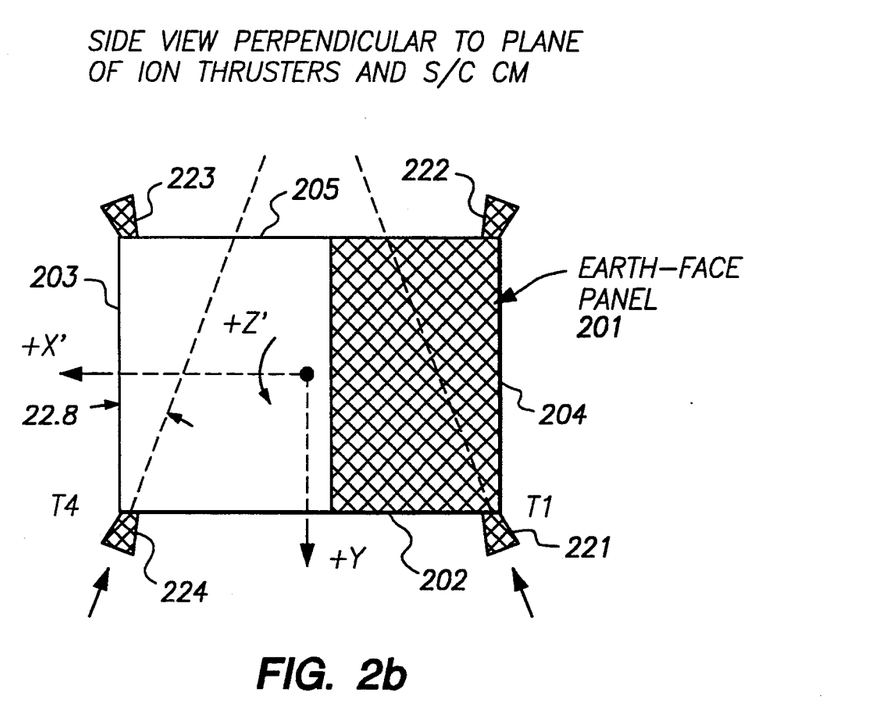
FIG. 2b is a side view perpendicular to the plane of the thrusters (221-224) of the same spacecraft (201).
Figure 2C:
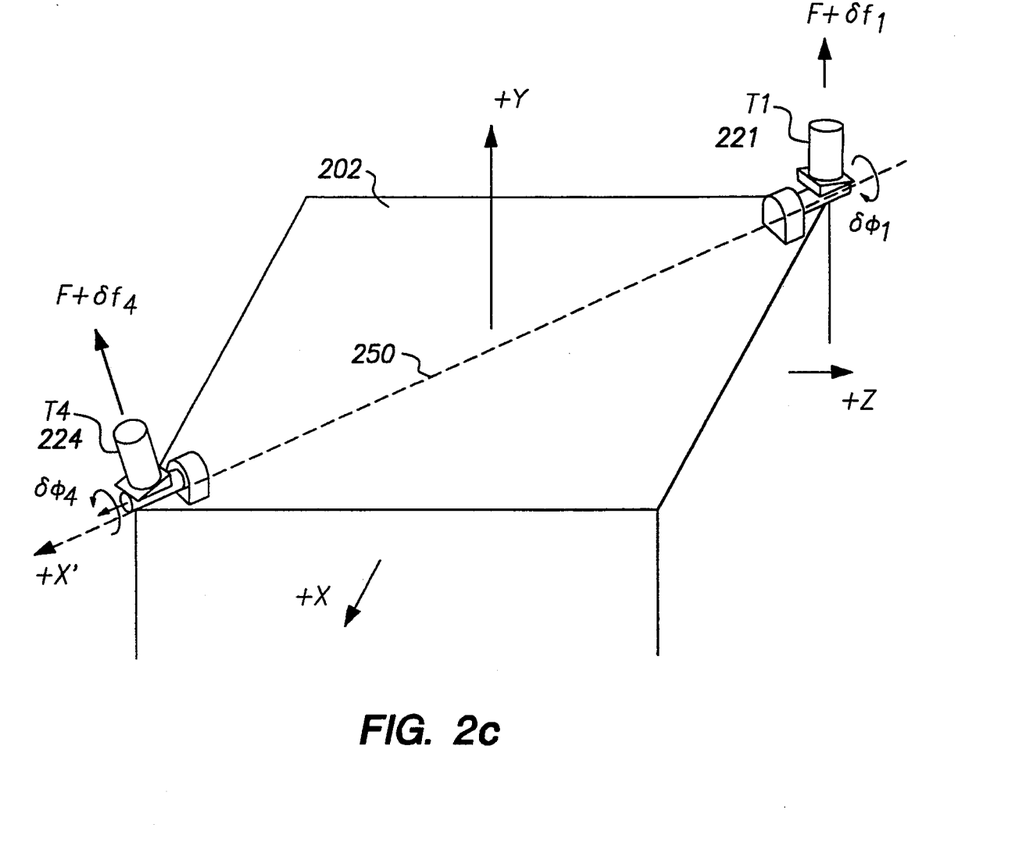
FIG. 2(c) is an isometric view of the south panel (202).
Figure 2D:
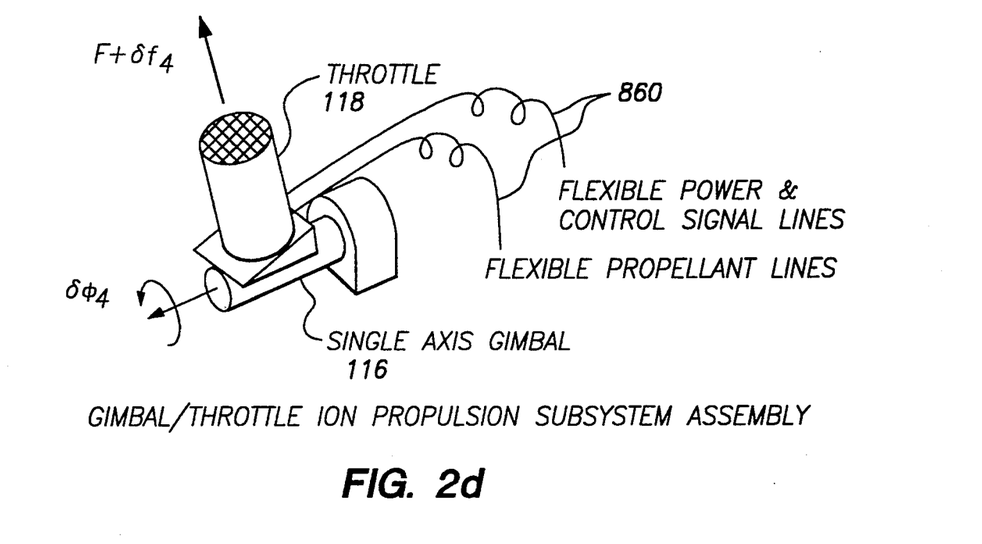
FIG. 2(d) is an isometric view of the gimbal/throttle assembly (116, 118).

Referring now to FIG. 1c, the ion propulsion-based momentum desaturation and yaw controller 802 is shown. Signals for yaw 107, and stored momentum 112, 113 are applied to processor subsystem 114. Yaw angle 107 is detected using a gyroscope 104 or sun sensor 105. In the preferred embodiment, both Digital Integrating Rate Assembly (DIRA) gyroscope 104 and Coarse Analog Sun Sensor (CASS) 105 are employed, and switch 106 selects which will be used to produce yaw body angle detection signal 107. Processor subsystem 114 mixes 302 yaw signal 107 with a reference value 301 and multiplies the result 303 by a constant 304 to achieve control torque 305. Similarly, processor subsystem 114 mixes 402 pitch momentum signal 112 with a reference value 401 and multiplies the result 403 by a constant 404 to achieve control torque 405, and also mixes 502 pitch momentum signal 113 with a reference value 501 and multiplies the result 503 by a constant 504 to achieve control torque 505. Gimbal and throttle geometry compensation subsystem 151 uses the control torque values 305, 405, 505 to produce thruster gimbal angle control signals 115 and thruster throttle control signals 117. In the preferred embodiment, processor subsystem 114 is implemented by a stored-program microprocessor-controlled circuit, but any circuit capable of calculating thruster gimbal and throttle control signals 115, 117 could be used in accordance with the present invention. Thruster gimbal angle control signals 115 are applied to single-axis gimbals 116 of the spacecraft thrusters 221-224. Referring also to FIGS. 2a-d, in the preferred embodiment, four thrusters 221-224 are mounted on the spacecraft 201, two thrusters 221, 224 being mounted essentially at the south panel 202 of spacecraft 201 and two thrusters 222, 223 being mounted essentially at the north panel 205 of spacecraft 201. In the preferred embodiment, thrusters 221-224 are each mounted at a nominal cant of 22.8° from the pitch (or Y) axis away from the spacecraft 201 and are coplanar with the nominal center of mass of the spacecraft 201 so that with gimbals 116 and throttles 118 in their neutral positions, firing of thruster pairs, e.g., 221, 224 produces no torque about any of the axes of spacecraft 201. The single axis gimbals 116 are of conventional design and provide approximately 5° of travel in quantized increments, each gimbal pivoting around tin axis connecting that gimbal with the gimbal of the other thruster mounted on the same spacecraft panel. For instance, gimbals 116 for thrusters 221 and 224 pivot around X' axis 250. The ion thruster throttles 118 are also of conventional design and provide approximately 10% throttling (reduction in thruster power) electronically, in quantized increments. Flexible propellant, power and signal control lines 860 connect with thrusters 221-224 to provide power and control. In typical operation of the thrusters, only the south-mounted pair of thrusters 221, 224 or the north-mounted pair of thrusters 222, 223 are fired tit any one time. The gimbals for a pair of thrusters are operated collectively or differentially, while the throttles for a pair of thrusters tire typically operated differentially, thus creating spacecraft torques about any combination of axes. Any required transformation from gimbal coordinates to spacecraft coordinates is performed conventionally in the gimbal/throttle geometry compensation 151.

While other forms of propulsion may be used in accordance with the present invention, ion propulsion thrusters are used in the preferred embodiment because they have relatively high efficiency. Furthermore, ion propulsion thrusters having thrust outputs in the range required for north-south station-keeping match well with conventional wheel momentum stabilization systems, so that combination of a conventional wheel momentum stabilization system 122 with the gimbals 116 and throttles 118 results in a well-damped control system. In the preferred embodiment, the conventional wheel momentum stabilization system produces stronger torques about the roll and pitch axes than those produced by the gimballed and throttled thrusters 221-224. This permits the conventional wheel momentum stabilization system to absorb the brunt of any perturbation about those axes, giving the gimbals 116 and throttles 118 time to attain their desired settings.

In the preferred embodiment of the present invention, nominal roll and yaw momentum and attitude control loops are high gain Linear Quadratic Gaussian (LQG) controllers, e.g., 301-312, as described below. Yaw body angle is converted into roll momentum in the conventional manner by use of a scaling factor determined by the pitch momentum bias of the spacecraft 201. Processor subsystem 114 determines the appropriate torque to apply to the spacecraft 201 for attitude control and momentum desaturation during north-south station-keeping by applying the signals for yaw 107 and stored momentum 112, 113 in accordance with these control systems, the basic closed-loop dynamics of which are illustrated in FIGS. 3-5.

Figure 3:
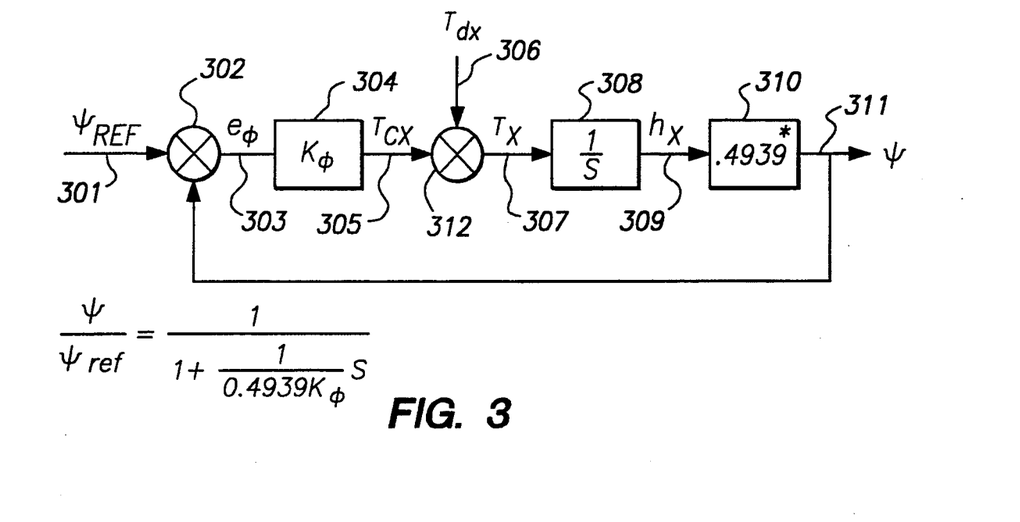
FIG. 3 is a simplified block diagram illustrating a roll momentum control system loop (301-312) of a spacecraft (201) in accordance with the present invention.

Referring specifically now to FIG. 3, there is shown a high-level block diagram of the control system 301-312 for the yaw axis of the spacecraft 201. The system 301-312 operates by mixing 302 a reference desired yaw value 301, typically defined to be 0, with a sensed yaw angle value feedback parameter 311. The resulting error value 303 is multiplied by a predetermined constant gain 304. The value of the predetermined constant gain 304 may be determined in a conventional manner to achieve a desired damping time constant, for instance under the established Terasaki or LQG methods. In the preferred embodiment, the LQG method is used, and the value of gain 304 is 0.003. Computer simulations, as are well known to those of ordinary skill in the art, can be used to verify the correct choice of the gain 304. The resulting control torque signal 305 is combined at 312 with a signal corresponding to any external disturbance torques 306 to yield the required torque value 307 for the yaw axis. This value is then integrated by the spacecraft natural dynamics 308 to yield an inferred roll momentum value 309, which is in turn multiplied by a predetermined constant 310 to yield the yaw axis attitude feedback parameter 311. The multiplication 310 approximates the actual relationship $h_x = 116 \sin \Psi$, where 116 is a factor representing the nominal level of pitch momentum in a pitch momentum-biased spacecraft, $h_x$ is the roll momentum of the spacecraft 201, and $\Psi$ is the yaw angle of the spacecraft 201. This approximation is reasonably accurate for small values of $\Psi$.

Figure 4:
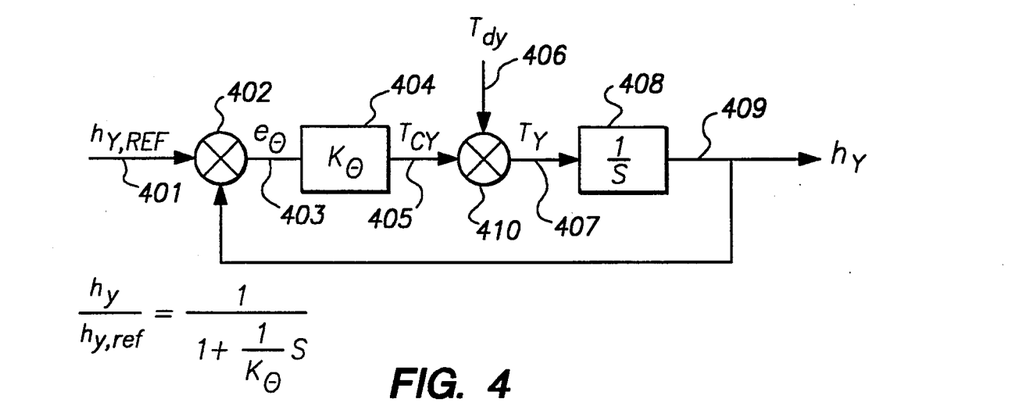
FIG. 4 is a simplified block diagram illustrating a pitch momentum control system loop (401-410) of a spacecraft (201) in accordance with the present invention.

Referring now to FIG. 4, there is shown a high-level block diagram of the control system 401–410 for the pitch axis of the spacecraft 201. The system 401–410 operates by mixing at 402 a reference desired pitch value 401, with a pitch value feedback parameter 409. The resulting error value 403 is multiplied by a predetermined constant gain 404. The value of the predetermined constant gain 404 may be determined under the Terasaki or LQG methods, as discussed above. In the preferred embodiment, the LQG method is used, and the value of gain 404 is 0.01. Computer simulations, as are well known to those of ordinary skill in the art, can be used to verify the correct choice of the gain 404. The resulting control torque signal 405 is mixed at 410 with a signal corresponding to any external disturbance torques 406 to yield the required torque value 407 for the pitch axis. Torque value 407 is then integrated by the spacecraft natural dynamics 408 to yield the pitch value feedback parameter 409.

Figure 5:
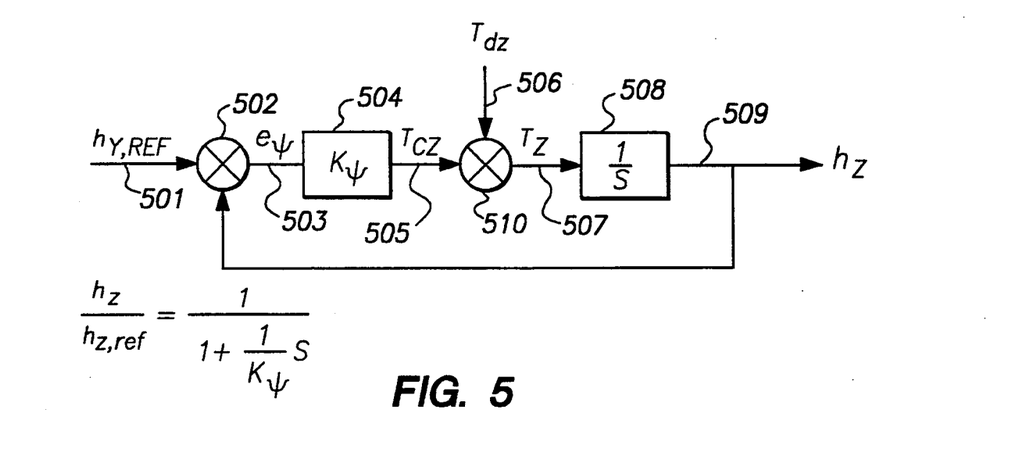
FIG. 5 is a simplified block diagram illustrating a yaw momentum control system loop (501-510) of a spacecraft (201) in accordance with the present invention.

Referring now to FIG. 5, there is shown a high-level block diagram of the control system 501–510 for the yaw momentum axis of the spacecraft 201. The system 501–510 operates by mixing at 502 a reference desired yaw momentum value 501, typically defined to be 0, with a yaw momentum value feedback parameter 509. The resulting error value 503 is multiplied by a predetermined constant gain 504. The value of the predetermined constant gain 504 may be determined under the Terasaki or LQG methods, as discussed above. In the preferred embodiment, the LQG method is used, and the value of gain 504 is 0.003. Computer simulations, its are well known to those of ordinary skill in the art, can be used to verify the correct choice of the gain 504. The resulting control torque signal 505 is mixed at 510 with a signal corresponding to any external disturbance torques 506 to yield the required torque value 507 for the yaw axis. This value is then integrated by the spacecraft natural dynamics 508 to yield the yaw value feedback parameter 509.

Referring again to FIGS. 1a–d, based upon the calculated desired torques about each of the axes of the spacecraft 201, processor subsystem 114 calculates the angle of thrust 115 and amount of throttling 117. The torque developed by a pair of thrusters, e.g., 221, 224, configured as described above may be determined by methods well-known to those of ordinary skill in the art. In the preferred embodiment, assuming a center of mass location given by coordinates [0, 0, 1474] mm; thruster 221 coordinates [−1476, 767, 2437] mm; thruster 224 coordinates [1476, 767, 511] mm; and cant angle of 22.8°, the torque is related to throttling and gimballing by the equations:

$$T_x = [-4.80(\delta\Phi_1 + \delta\Phi_4) + 3.37(\delta f_1 - \delta f_4)] \times 10^{-}Nm \quad 1$$

$$T_y = [-13.18(\delta\Phi_1 - \delta\Phi_4)] \times 10^{-4} Nm \quad 2$$

$$T_z = [3.12(\delta\Phi_1 + \delta\Phi_4) + 5.17(\delta f_1 - \delta f_4)] \times 10^{-4} Nm \quad 3$$

where $\delta\Phi$ is the desired change in gimbal angle, $\delta f$ is the desired change in throttling, $(\delta\Phi_1 + \delta\Phi_4)$ is the gimbal collective, $(\delta\Phi_1 - \delta\Phi_4)$ is the gimbal differential, and $(\delta f_1 - \delta f_4$ is the throttle differential. The values of gimbal and throttle control signals 115, 117 may thus be calculated by the gimbal/throttle geometry compensation 151 in the processor subsystem 114 once the processor subsystem 114 has determined the appropriate torques $T_x$, $T_y$, and $T_z$ to apply to the spacecraft 201. The gimbal and throttle control signals 115, 117 are then sent, using conventional techniques, to mechanical controls for adjusting each thruster, e.g., 221, to a desired angle, and to electrical controls for adjusting each thruster throttle 118, thereby producing the desired dynamic torques on the spacecraft 201. The process of sensing spacecraft 201 position, attitude, and stored momentum; calculating the torques to be applied on the spacecraft 201 to produce the desired changes; and adjusting the thruster gimbals 116 and throttles 118 to provide the desired spacecraft 201 dynamics is continued during the entire period of station-keeping maneuvers Simultaneous with the above-described thruster control, the spacecraft momentum wheel controller system 810 continues to operate, also producing torques for the stabilization of spacecraft attitude. The wheel controller system 810 produces larger torques than the gimballed and throttled thrusters 221–224, and is used for coarse control of attitude and momentum, while the gimballed and throttled thrusters 221–224 provide finer control. Should a momentum wheel, e.g., 120, saturate, the thruster control system 802 detects such saturation and adjusts the gimbals 116 and throttles 118 to gradually return the wheels 120, 121 to their reference speeds, the control torque from the thrusters 121–124 equalling the rate of change of wheel, e.g., 120, momentum. Thus, the rate of desaturation depends on the magnitude of the moment produced by the thrusters 221–224.

Figure 6:
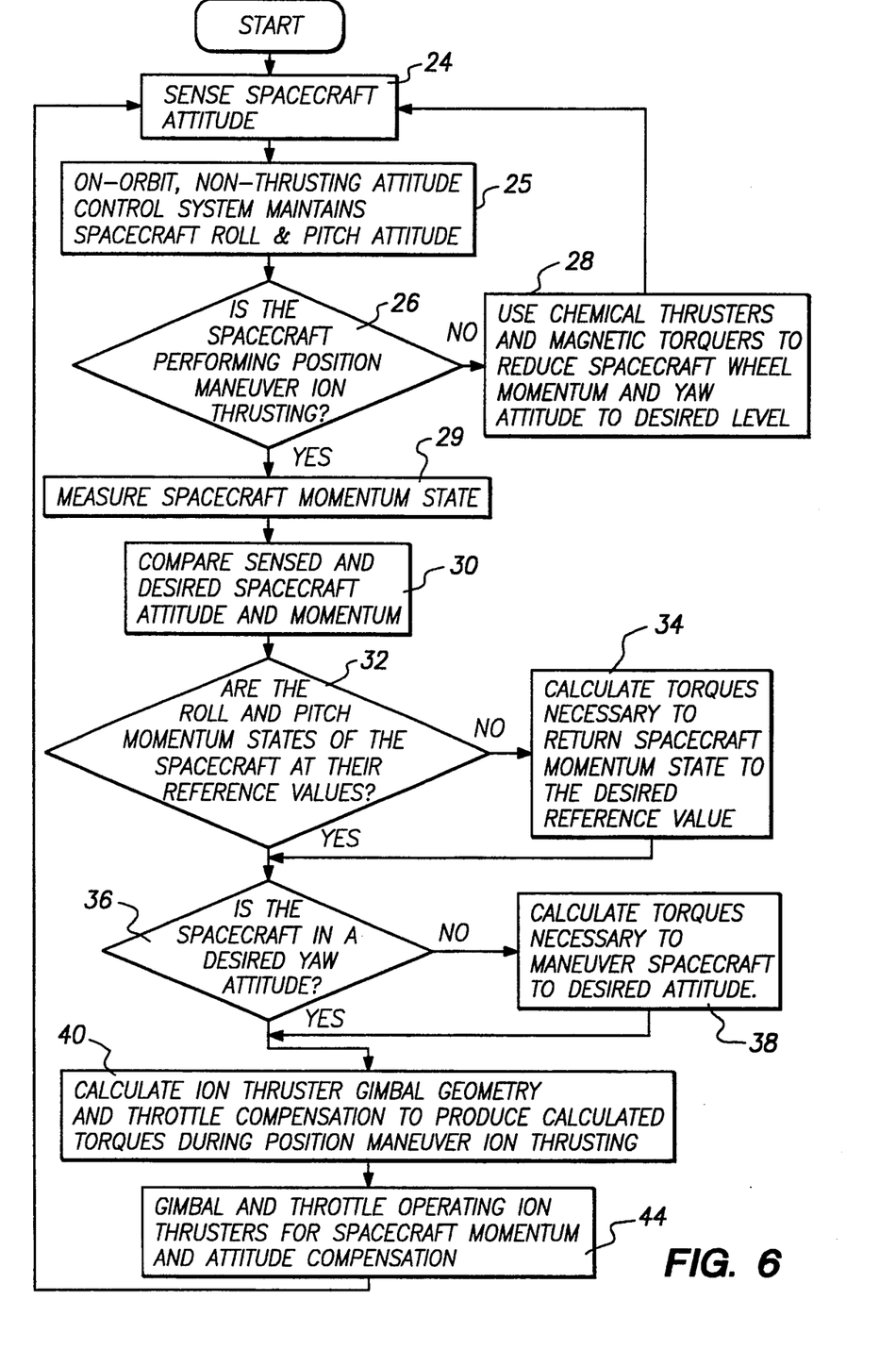
FIG. 6 is a flow diagram of spacecraft (201) control in accordance with the present invention.

Referring now also to FIG. 6, there is shown a flow diagram of spacecraft 201 control in accordance with the present invention. The north-south position 201, the spacecraft 201 is determined conventionally by ground control 119. Should ground control determine that correction in north-south positioning is required, ground control signals the appropriate pair of thrusters, e.g., 221, 224 to fire. In the preferred embodiment, the firing of thrusters 221–224 for north-south station-keeping is not controlled on-board the spacecraft 201.

The first step of the flow in FIG. 6 is to sense at 24 the current attitude of the spacecraft 201, as discussed previously in connection with FIG. 1. The wheel controller 802 responds to roll and pitch attitude changes. A check at 26 is then made to see if ground control 119 has commanded the firing of a pair of ion thrusters, e.g., 221, 224 for position maneuvering. If not, conventional non-ion-thrusting attitude control systems 804 maintain spacecraft momentum 28. Specifically, when none of the thrusters 221–224 is firing, other perturbations of the types previously mentioned cause body torques, producing body attitude errors. Errors in roll and pitch attitude are quickly sensed by the conventional earth sensor 101 of the spacecraft 201 and nulled by storage of the gained momentum in the momentum wheel controller 810 of the spacecraft 201. Yaw errors couple into roll errors, which are estimated and slowly reduced by magnetic torquing in momentum desaturation controller 812. Yaw momentum is also slowly reduced by magnetic torquing. Pitch momentum is quickly reduced in the conventional manner by brief chemical thruster 816 firings.

If check 26 reveals that the ion thrusters, e.g., 221, 224, are firing, a number of subsequent steps control spacecraft 201 attitude and momentum. Before detailing those steps, however, it is instructive to consider the result of spacecraft 201 thrusting without these subsequent control steps. Without throttling and gimballing in accordance with the present invention, when one pair of the thrusters 221–224 are firing for north-south stationkeeping, much larger body torques than in the non-thrusting mode result due to misalignment of thrust from the center of mass. As in the non-thrusting mode, the wheel controller 810 attempts to null roll and pitch errors, but the wheels 120, 121 may not be able to store new momentum quickly enough to do so, or they may reach the limits of their operational speeds. Yaw error is uncontrolled, as magnetic torquer correction is far too slow to correct yaw error or unload momentum.

In accordance with the present invention, these effects are avoided by introducing counteracting body torques by throttling and gimballing thrusters 221–224 during firing. Specifically, and referring again to FIG. 6, the state of spacecraft 201 momentum relative to a reference value is measured at 29, the sensed and desired momentum and attitude are compared at 30, and a check 32 is made to see whether the sensed momentum of the spacecraft 201 is equal to the reference value. If so, processing passes to step 36. If not, the torques required to return the spacecraft 201 momentum state to the desired reference value are calculated at 34, and processing passes to step 36. In step 36, another check is made to see whether the sensed yaw attitude of the spacecraft 201 is equal to the desired yaw attitude. If so, processing passes to step 40. Otherwise, the torques required to maneuver the spacecraft 201 to the desired yaw attitude are calculated at 38, and processing passes to step 40. The gimbal 116 geometry and throttle 118 compensation required to produce the torques determined in steps 34 and 38 are calculated in step 40, and the thrusters, e,g., 221, 224 are gimballed and throttled accordingly 42, before processing iterates from step 24. Through this iterative process, the gimbals 116 and throttles 118 return to their quiescent values when the actual momentum and attitude match the desired values. After a station-keeping maneuver is complete, attitude errors and momentum errors are zero, so no magnetic torque or unload desaturation is needed.

Therefore, a spacecraft simultaneously maintains a desired attitude and desaturates momentum wheels while performing north-south station-keeping maneuvers.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

We Claim:

1. A wholly-autonomous closed-loop method of simultaneously moving a three-axis stabilized spacecraft having thruster means to attain a desired attitude during north/south maneuvers, said method comprising the steps of:

sensing a current spacecraft attitude;

determining a first set of forces necessary to produce said desired attitude given said sensed current spacecraft attitude;

gimballing said thruster means; and throttling said thruster means by adjusting power applied therto, said steps of gimballing and throttling causing said thruster means to produce said first set of forces on the spacecraft simultaneous with activation of said thruster means to produce a change in velocity of the spacecraft in the north/south direction, said steps of gimballing and throttling further being controllably performed to substantially eliminate a torque applied to a body of said spacecraft due to the activation of said thruster means.

2. The method of claim 1, wherein said thruster means comprises an ion propulsion system.

3. The method of claim 1, wherein said spacecraft has at least one momentum wheel for purposes of stabilizing said spacecraft, said method further comprising the steps of measuring stored momentum in said at least one momentum wheel, determining a second set of forces necessary to attain a predetermined value of said stored momentum, and controllably activating said thruster means to produce said second set of forces simultaneously with said production of said first set of forces.

4. The method of claim 1, wherein the step of gimballing comprises angular adjustment of said thruster means in a predefined step size.

5. The method of claim 1, wherein the step of throttling comprises power adjustment of said thruster means in a predefined step size.

6. A system for attaining a desired attitude of a three-axis stabilized spacecraft during positional maneuvers, comprising:

attitude sensing means;

computational means producing gimbal and throttle control signals responsive to said attitude sensing means;

gimballing means responsive to said gimbal and throttle control signals;

throttling means responsive to said gimbal and throttle control signals; and thruster means disposed for angular adjustment by said gimballing means and power adjustment by said throttling means, for maneuvering said spacecraft to said desired attitude by generating a first set of forces on the spacecraft in response to said gimbal and throttle control signals, said gimbal and throttle control signals being produced by said computational means so as to substantially eliminate a torque applied to a body of said three-axis stabilized spacecraft due to operation of said thruster means.

7. The system of claim 6, wherein said thruster means comprises an ion propulsion system.

8. The system of claim 6, wherein said spacecraft comprises a momentum wheel stabilizing system storing momentum, said system for attaining said desired attitude further comprising momentum measurement means producing a momentum signal responsive to said stored momentum;

said computational means receiving said momentum signal from said momentum measurement means and determining in response to said momentum signal a second set of forces necessary to attain a predetermined value of said stored momentum, said computational means further producing said gimbal and throttle control signals for controllably activating said gimballing means and throttling means so that the thruster means produces said second set of forces simultaneously with said production of said first set of forces.

9. The system of claim 6, wherein said gimballing means are disposed for angular adjustment in a predefined step size.

10. The system of claim 6, wherein said throttling means are disposed for power adjustment in a predefined step size.

11. The method of claim 1 wherein the step of sensing current spacecraft attitude is performed with respect to each of three orthogonal axes denominated roll, pitch, and yaw.

12. The method of claim 1 wherein the thruster means comprises exactly two thrusters.

13. A wholly-autonomous closed-loop method of simultaneous attitude control, momentum unloading, and north/south orbital stationkeeping for a three-axis controlled spacecraft having thruster means and at least one momentum wheel, said method comprising the steps of:

sensing a current spacecraft attitude about each of three orthogonal axes denominated roll, pitch, and yaw;

determining a first set of forces necessary to produce a desired attitude given said sensed attitude;

measuring momentum stored in said at least one wheel;

determining a second set of forces necessary to attain a predetermined reduced value of said stored momentum; and controlling a position of and a power output by the thruster means to produce a combination of the first and second set of forces on the spacecraft simultaneously, and simultaneous with activation of the thruster means to achieve a change in velocity of the spacecraft in the north/south direction.

* * * * *